Oct. 7, 1969   R. A. WOODSON   3,471,239
INTERFEROMETRIC APPARATUS
Original Filed Oct. 2, 1962   6 Sheets-Sheet 1

FIG. 1A   FIG. 1B

ROBERT A. WOODSON
INVENTOR

BY Richard J. Stephens
ATTORNEY

ROBERT A. WOODSON
INVENTOR

BY Richard L. Stephens
ATTORNEY

FIG. 5

ROBERT A. WOODSON
INVENTOR

BY Richard L. Stephens
ATTORNEY

Oct. 7, 1969      R. A. WOODSON      3,471,239

INTERFEROMETRIC APPARATUS

Original Filed Oct. 2, 1962      6 Sheets-Sheet

FIG. 4A

ROBERT A. WOODSON
INVENTOR

BY Richard T. Stephens
ATTORNEY

United States Patent Office 3,471,239
Patented Oct. 7, 1969

3,471,239
INTERFEROMETRIC APPARATUS
Robert A. Woodson, Vestal, N.Y., assignor to Singer-General Precision, Inc., a corporation of Delaware
Continuation of application Ser. No. 227,854, Oct. 2, 1962. This application Jan. 10, 1966, Ser. No. 523,003
Int. Cl. G01b 9/02
U.S. Cl. 356—110                                    21 Claims This is a continuation of my copending application Ser. No. 227,854, filed Oct. 2, 1962, now abandoned. This invention relates to an interferometric apparatus, and more particularly, to an improved interferometric goniometer which utilizes the interference fringe patterns produced by two beams of light of predetermined wave length to obtain precise measurements of angles.

In many instances, it is desirable to make and determine angular displacements with a high degree of precision. Among the prior art instruments which have been employed to perform this angular measurement function are theodolites, goniometers, etc. Recently, the principles of interferometry have been employed to determine displacements, to a degree of accuracy hitherto unobtainable. By way of example, a linear interferometer is disclosed in Patent No. 2,604,004, granted July 22, 1952 to Root. A monochromatic light source of small cross section, is provided which produces a light beam having sharp spectral lines. The light beam is directed to a collimating lens and monochrometer which converts the original beam into a substantially parallel beam of light having a considerable cross sectional area. The parallel light beam is in turn directed toward a half-reflecting mirror or beam splitter positioned at an angle with respect to the incident beam whereby one portion of the light energy passes through the beam splitter and the other portion is reflected. The reflected light energy is directed toward a first mirror which is located at a fixed distance from the beam splitter and the light energy which passes through the beam splitter is directed to a second mirror which is movable on a carriage in a direction parallel to the light beam incident thereon. Each of the mirrors reflects the incident light and returns it to the beam splitter where it combines to form an interference pattern of light energy whose intensity varies cyclically as a function of the position of the second mirror relative to the beam splitter. The interference pattern produced, that is the number of cycles of the fringes appearing, is proportional to the distance traversed in the measurement undertaken. The number of cycles of the interference fringes which are produced as the result of the variable distance is detected by a photosensitive means and is counted by an electronic counter. The electronic counter eliminates any subjective human error in making the reading since the counter fringes are generated and read automatically. From the known wavelength of the light used, the distance is readily determined. In this manner, precise measurements of linear dimensions are obtained.

The above general principles have still more recently been applied to accurately determine angular measurements, as is disclosed, by way of example, in copending application Ser. No. 62,394, filed Oct. 13, 1960 and assigned to the assignee of this invention, now Patent No. 3,186,294. As there shown, portions of the optical system comprising the light source, collimating lens, and a prism are rigidly secured to stationary apparatus termed a "stator." In alignment with the stator is a rotatable platform, or "rotor," upon which is secured a second optical portion comprising a group of reflector devices and one or more optical beam-splitters, and called the "gonior." Another optical portion of the stator comprises retroreflecting means having a fixed alignment with respect to the previously mentioned optical portions secured to the stator. Additionally, photosensitive means and an electronic counter are included, all as hereinabove described. Briefly, an angular measurement is performed by directing a collimated light beam from the source toward the beam-splitter of the gonior. The reflected and transmitted light beams formed thereby are directed, by the reflector devices, into a pair of parallel spaced-apart, light beams incident on the retroreflecting devices. Thereafter, the light beams are again combined at the beam-splitter in a manner similar to that described above. As a result of the change in length of each of the parallel light beams as the gonior rotates, one increasing and the other decreasing, the angular displacement of the rotor with respect to the stator is readily determined.

Although the apparatus of the referenced copending application successfully solved many of the problems inherent in the design of an interferometric goniometer, several additional problems still remain. The first of these involves mechanically maintaining the retroreflector device in precise alignment with the other optical portions of the stator while including a rotatable platform interposed therebetween. Not withstanding that the usual mechanical tolerance are relatively simple to maintain, the problem greatly increases in magnitude when it is considered that the measured angle is read to closer than $\frac{1}{10}$ second of arc, and minute changes in alignment are sufficient to introduce appreciable errors in the overall measurement. Secondly, it should be readily apparent that the total overall angle that can be measured is limited by the design of the apparatus itself, since rotation of the gonior through too great an angle is effective to direct one or the other of the parallel light rays away from the retroreflecting means.

It is an object of the invention, therefore, to provide an improved angular interferometric apparatus.

Another object of the invention is to provide an interferometric apparatus for measuring angular displacements as great as 360°.

Still another object of the invention is to provide an improved interferometric apparatus capable of reading angular displacements within the range 0–360° to closer than $\frac{1}{10}$ second of arc.

Yet another object of the invention is to provide an improved optical system for an angular interferometric apparatus.

A further object of the invention is to provide an angular interferometric apparatus in which looseness of the rotor bearing does not adversely effect the resultant angular measurement.

According to the invention, however, there is provided in improved interferometric goniometer which furnishes solutions to each of the above enumerated problems. Briefly stated, the apparatus of the present invention features an interchange of the functions of the prior art devices wherein the various reflectors and beam splitters are optical elements secured to the stator, and the gonior, includes only the retroreflecting means. In this manner, the need of interposing a rotatable table between two portions of the stator is obviously eliminated, and as more particularly described in detail hereinafter with respect to several embodiments of the invention angular measurements over the ranges of 45°, 90° and 360° are reliably and accurately determined.

A further feature of the invention by which the above objects are attained is the placement of the gonior of retroflecting devices rather than plane mirrors. Some of the advantages and disadvantages of the substitution of retroflectors for plane mirrors and interferometers are disclosed in Peck Patent No. 2,571,937, granted Oct. 16, 1951.

Figure 4A:
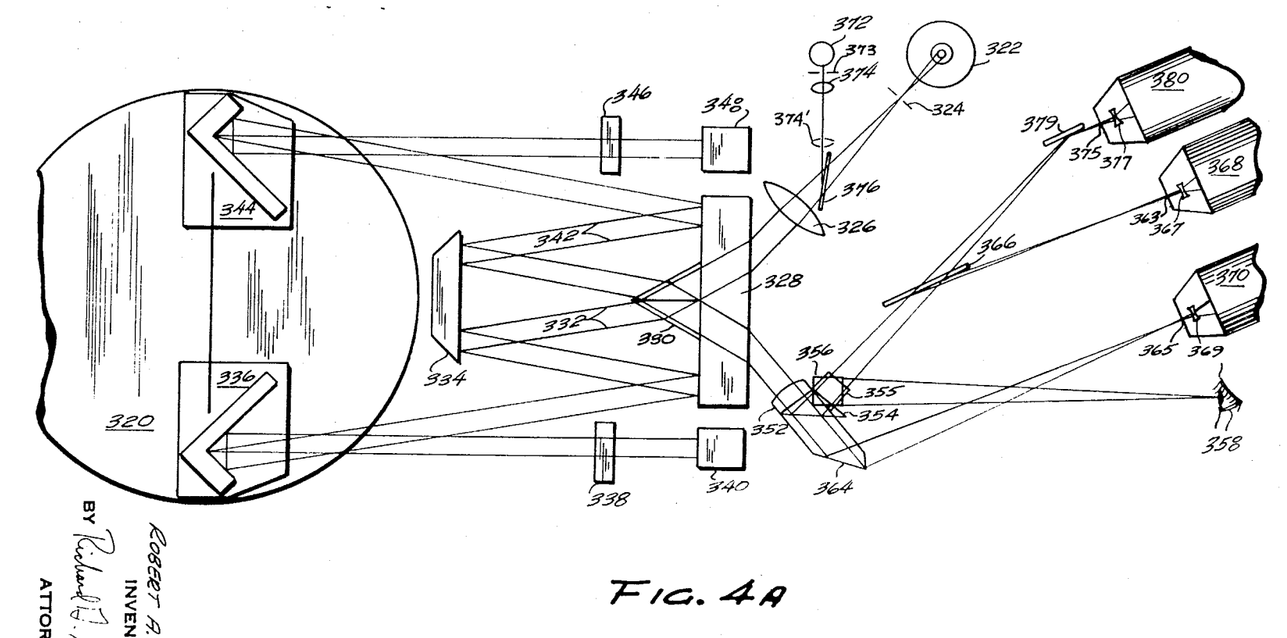
FIG. 4A is an optical schematic of yet another embodiment of the interferometric apparatus of the invention.

Retroreflecting devices are known in several embodiments of which the triple-mirror corner reflectors are perhaps the best known, but other forms are also suitable for interferometry as illustrated and explained in copending application Ser. No. 769,736, filed Oct. 27, 1958 and now Patent No. 3,158,674 and assigned to the assignee of this invention. These include the cube-corner prism, the auto-collimating lens type and the Toralto lens type. It is a common property of all these retroreflectors that an inverted image of an object is formed having symmetry about a point which is fixed with respect to the position of the retroflector and which corresponds to the symmetry center in the retroflector; this is the virtual vertex in the case of a cube-corner prism. Because of this property, motion of the retroflector through a distance S/2 in any direction causes the image of a fixed object to move a distance S in the same direction. Similarly, a right-angle dihedral mirror reflects an image which is reversed and displaced about the intersecting line of the mirror planes. As the term rereflector is used in this specification and appended claims, it is understood to denote an optical element or combination of optical elements having either of the above just-described properties whereby any ray of a class incident upon the device is returned in the opposite or anti-parallel direction and, except for rays incident on the point or axis of symmetry, displaced laterally. The 85° roof mirrors of FIG. 4A are here embraced by the term rereflector because they are dihedral reflectors.

While the application of retroflectors to the interference goniometer disclosed herein vastly increases the angular range of the instrument, at the same time they require compensation for unequal shifting of the interfering beams which may result from imperfections in the devices. It is accordingly a further object of the invention to provide an interference goniometer wherein errors due to inadvertent translation of the gonior are minimized.

These and other objects of the invention will be pointed out in the following description and claims and illustrated in the accompanying drawings which disclose by way of example, the principle of the invention and the best mode which has been contemplated of applying that principle.

Figures 1A, 1B:
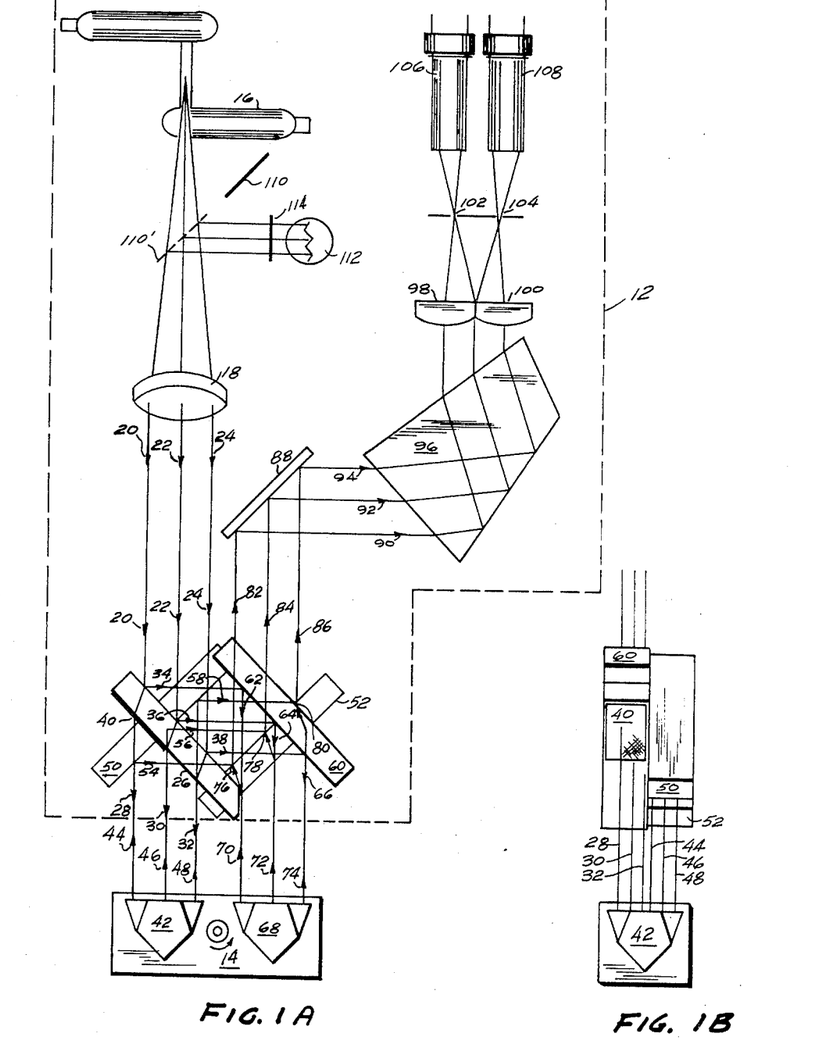
FIG. 1A is an optical schematic of one embodiment of the interferometric apparatus of the invention.
FIG. 1B is a side view of a portion of the optical schematic of FIG. 1A.

Referring now to the drawings, FIG. 1 illustrates a first embodiment of the angular interferometric apparatus of the invention. As there shown, the apparatus comprises two separated optical portions, namely a stationary apparatus shown within dashed lines, and a rotatable "gonior" member shown at 14. The first, mounted on the stationary portion of the apparatus, or stator, 12, (not shown). The stationary apparatus includes devices for collimation of light, intensity division, phase retardation, recombining, and spectral filtering, all as more particularly hereinafter described. The second optical portion, or rotatable gonior 14, includes a pair of retroreflecting devices and provides the necessary variation in optical length with rotation.

It should be noted that although light beams are employed in the detailed description of each of the several embodiments of the invention, the invention is not limited to visual radiation, but radiation of other and various wave lengths may be so employed.

Substantially monochromatic light generated by a D.C. Krypton light source 16, or similar device, is directed towards a lens 18 and is collimated thereby to obtain a substantially parallel light beam indicated by rays 20, 22 and 24, which beam is next directed to a beam-splitter 26 shown positioned at an angle of 45° with respect to the incident light beam (20, 22, 24) in this embodiment, thereby providing two light beams. The first, or transmitted beam, is indicated by rays 28, 30 and 32, and the second, or reflected beam, is indicated by rays 34, 36 and 38.

Continuing now along the optical path of the transmitted beam, it should be noted that the lower surface of beam splitter 26 carries a phase retarder coating 40, which is effective to retard the phase of that one-half of the transmitted light beam between rays 28 and 30. Note may be made of the fact that the transmitted light beam traverses phase retarder coating 40 only once, and retarder coating 40 provides a retardation of one-quarter wave length of the light employed in order to obtain a desired 90° phase shift. Coating 40 may be a uniform thin coating of silica or titania deposited by vacuum deposition, or the like.

The beam (rays 28, 30 and 32) transmitted through beam splitter 26 is directed toward gonior 14 and enters a cube corner reflector 42 through one-half of its aperture. After three reflections within the cube corner prism each ray emerges from the other half of the prism antiparallel and laterally displaced to the opposite side of the vitual vertex reative to the incident ray. This reflected light beam is indicated by rays 44, 46 and 48 which are reflections or rays 32, 30, and 28 respectively (see FIGS. 1A and 1B). Reflected beam (44, 46, 48) is then intercepted by mirror 50 and directed as shown at 54, 56, 58 toward recombing beam splitter 52.

The light beam reflected by beam-splitter 26 is shown by rays 34, 36 and 38, and this beam is re-directed by a second full mirror 60 toward rotatable gonior 14 as shown by rays 62, 64 and 66. It should be noted that this further light beam (62, 64, 66) is parallel to, but spaced apart from, the other light beam (rays 28, 30, 32) directed at the gonior. Beam (62, 64, 66) enters the near half of retroflector cube corner 68 and each of its rays emerges antiparallel and displaced to the opposite side of the point of symmetry from its incident path. The reflected light beam is indicated by rays 70, 72 and 74, which are reflections of rays 66, 64 and 62 respectively. It should be noted at this point that when the stator elements are adjusted to project the beam (rays 28, 30, 32) and the beam (rays 62, 64, 66) centered the centers of the retroflectors 42 and 48, then each ray of the first beam is deflected laterally by its retroflector in the same direction and by the same amount as its isogenous twin ray 28 is displaced by its retroflector. Thus, as illustrated ray 28 is displaced to form ray 48 by the same amount and in the same direction as its isogenous twin ray 62 is displaced to form ray 74. The beam energing from the retroflector 68 is next intercepted by recombing beam splitter 52, and a portion of the reflected light beam is transmitted through beam splitter 52, thereby providing recombination with rays 54, 56 and 58 at points 76, 78 and 80, by way of example, on the upper surface of beam-splitter 52. The recombined light beam, including rays 82, 84 and 86 exhibits the prenomenon of optical interference. It should be noted also that misalignment of the beams due to motion of the gonior perpendicular to the beam, either laterally in the plane of FIGURE 1A, or normal to a plane of FIGURE 1B by an amount S/2 will cause a bulk displacement of both the retroflected beams a distance S but since both retroflected beams are deflected by the same amount and remain parallel they recombine exactly as above described and, further, the recombined beam (rays 82, 84, 86) is also reflected in the same direction by the same amount and the resulting interference pattern is moved by this amount and this amount only. The mirror 88 is provided in FIGURE 1A solely to facilitate the arrangement of the optical elements and performs no other function than to redirect the recombined beam as a further beam (rays 90, 92, 94) into the constant deviation dispersing prism 96, which provides spectral separation of residual unwanted wave lengths provided by light source 16. The filtered beam, upon leaving prism 96, is collected by a pair of stigmator lenses 98 and 100 and directed through a pair of pinhole apertures 102 and 104 of photomultiplier tubes 106 and 108, which convert the variations in light intensity (resulting from the phenomenon of interference) into electrical signals. It will be clear to those skilled in the art that apertures 102 and 104, together with prism 96, and lenses 98 and 100, serve to monochromatize the light beam to a greater degree than is characteristic of the untreated beam. The electrical outputs of the photomultiplier are then fed to a reversible electronic counter (not shown), which may be of the type shown and described in U.S. Patent No. 2,833,476.

The utilization of a pair of photomultipliers and a reversible counter provides direction sensitivity in the manner described in abovementioned copending application Serial No. 62,394. Remembering that phase retarder 40 introduces a 90° phase shift in a portion of the light beam, it can be seen that the sequence of interference maxima and minima of the light incident on photomultiplier 106 is shifted 90° with respect to that of the light incident on photomultiplier 108, and the electrical signals provided by the photomultipliers accordingly display this same phase shift. These out-of-phase interference fringe signals are accepted by the reversible counter and, depending upon which of the other signals is leading in phase, the total count of interference fringes displayed by the counter is either added to or subtracted from.

The number of interference fringes which occur for a given angular displacement of gonior 14 relative to stationary apparatus 12 is not proportional to the angular displacement, but rather to the sine of the angular displacement between apparatus 12 and gonior 14. Consequently, it is necessary to know precisely when the angle is zero in terms of the count displayed by the counter in order to measure a given angular displacement. Provision of a zero angle indication may be accomplished in the same manner as previously described in the abovementioned Patent No. 3,186,294. White light is introduced into the system by positioning a movable mirror 110 to the position indicated in FIG. 1A as 110′, and energizing light source 112 which may be, by way of example, a tungsten filament lamp. Mirror 110 also interrupts the monochromatic light theretofore provided by lamp 16. Ground glass filter 114 may be positioned intermediate source 112 and mirror 110 to produce a more uniform distribution of the polychromatic light, by randomly scattering the light as it passes therethrough. Rays from white light source 112 traverse the previously mentioned optical paths of the apparatus and impinge on photomultipliers 106 and 108, which detect the resultant interference state of the white light. It may be noted that the output signals of the photomultiplier will be detachable only when the optical path length difference between the two system paths is near zero, and such signals will be maximum when equal path lengths are obtained. This maximum corresponds to the zero angle relationship between the stator and the gonior. At this time the counter may be reset to zero, then white light source 112 may be de-energized, and mirror 110 returned to its reset position to unblock the light from source 16.

It is necessary that beam-splitters 26 and 52 have mutually similar optical properties in order to ensure that both of the two eventually-interferring optical paths within the stationary apparatus 12 exactly equal optical length, since each of the parallel light beams incident upon the gonior independently traverses only one of the two mentioned beam-splitters. Such equality is readily accomplished by fabricating the beam-splitters from the same thickness of the same material. Although sensors 106 and 108 are shown sensing the parallel light beams recombined at the upper surface of beam-splitter 52, a portion of the beam (54, 56, 58) is transmitted through beam-splitter 52 and a portion of a second beam (70, 72, 74) is reflected by beam-splitter 52, and it is therefore possible to observe and detect interference fringes optically or otherwise, from the right-hand side of beam splitter 52 as view in FIG. 1, from a position off in a direction aligned with the light beam which includes rays 54, 56 and 58 as indicated by dotted rays 82′, 84′ and 86′.

The necessary power is applied to the electrical portions of the system of the present invention, i.e., light source 16, the electronic counter, etc., and a zero adjustment operation is performed as above described. Next, relative rotation of the gonior with respect to the optical elements monuted on stator 12 results in a total count being displayed by the counter indicative of the number of interference fringes which occurred during the rotation the gonior, the total count being equal to a known constant multiplied by the sine of the angle through which the gonior has been rotated. By means of a multi-place table of natural sines, or, alternatively, a digital conversion device, the angular displacement of the gonior from its zero position may be readily determined.

It should be noted that the embodiment just described appears similar in principle to an apparatus disclosed and illustrated in U.S. Patent 2,571,937. However, as will be understood by those skilled in the art, the above described embodiment of the invention, and each of the embodiments hereinafter described, all afford freedom from error which otherwise would be caused by any inadvertent linear translation of the gonior during rotation, a feature which hitherto has not been achieved by the prior art. Although the arrangement shown in FIGURE 9 of the Peck patent does render the path length traversed in the instrument measured from a plane wave front projected by the input collimator to an emerging plane wave front (at the 181) constant for any ray independent of the lateral displacement of the gonior 70 and although it is said in the above-mentioned patent that this feature automatically compensates for any errors due to looseness of the bearing about which the gonior swings, that the arrangement disclosed in the Peck patent does not in fact compensate for a major portion of such errors in practical instruments using practical pre-laser light sources will be apparent from an understanding of the true nature of such sources. In order to clearly explain the extent and scope of this invention, it is necessary to comprehend the nature of such sources and the result of the interaction of two beams from such a source at a beam-splitter. This is best defined using several technical terms which are defined for the purpose of this specification as follows:

(1) A wavefront is defined as a surface over which the phase of a beam of radiation is constant.

(2) The phase $\phi$ of an electromagnetic wavefront at a given field point in space is defined to be an angle equal to $2\pi ft$ where $f$ is the frequency of the electromagnetic radiation and $t$ is the time required for the wavefront to travel from the source of radiation to said field point.

(3) A certain wavefront of one beam is said to be "isophase" with respect to a certain wavefront of another beam if the two beams are isogenous (i.e. if they have the same source) and if at some instant in time the two wavefronts have the same phase.

(4) Two isogenous beams of plane waves said to be "isophase" if an arbitrary pair of isophase wavefronts, one from each beam are co-planar.

(5) Two isogenous beams of plane waves are said to be "isophase" if an arbitrary pair of isophase wavefronts, one from each beam, are biplanar.

(6) For the purpose of this disclosure we shall define "beam splitter" as the plane upon which is incident a beam of electromagnetic radiation such that said incident beam is split at said plane surface into a pair of biphase split beams.

(7) Two wavefronts are said to be identical if one wavefront may be made to coincide with the other by a translation without rotation.

(8) Two beams are said to be identical if a wavefront of one is identical with a wavefront of the other and the beams are isophase.

(9) Two wavefronts are said to be mirror identical if one may be made to coincide with the other by a reversal about an axis substantially parallel to the front and the beams are isophase.

(10) Two beams are said to be mirror identical if there is a wavefront of the one which is mirror identical with a wavefront of the other.

(11) Two wavefronts are said to be similar if one may be made similar to the other by a transformation of scale followed by a translation without rotation. Thus, all wavefronts of identical beams are similar.

(12) Two wavefronts are said to be mirror similar if one may be made similar to the other by reversal about an axis substantially parallel to the front.

(13) Two beams are similar if a wavefront of one is similar to a wavefront of the other.

(14) Two beams are said to be symmetrical relative to a given axis if they are either similar, or mirror similar about a second axis perpendicular to the direction of propagation and to said given axis.

The reasons why interference effects have not until recently been observed between light beams emanating from different sources lies in the genesis of light in individual quantum transformations within individual atoms as set forth in the book Concepts of Classical Optics by John Strong, published by W. H. Freeman Co., Inc., 1958 at pages 374 and 375. In consequence of this fundamental property light derived from a single source is also only *relatively coherent*. Accordingly, wavefronts while nominally considered to be spherical or plane are in fact complex and deviate from the ideal from time-to-time and from place-to-place by a substantial fraction of a wavelength. In consequence, where fringes are observed by the interference between two beams from the same source the sharpness of the fringes diminishes as the angular separation of the two beams at the source is increased. Accordingly, the smaller the aperture of the optics the sharper the fringes, but the less light there is to observe; and therefore any practical instrument represents a compromise between these factors. It was a genius of Michelson that recognized that extended sources have substantially non-ideal wavefronts yet the reflected and transmitted beams from a beam splitter have wavefronts which correspond on a point-by-point basis. Thus if an interferometer is designed so that each pair of rays generated at the first beam splitter is directed through the mechanism so as to be reunited with its isophase twin after transversing equal path lengths, then perfect reinforcement and almost perfect cancellation result and sharp fringes are observed. Thus, the Michelson instrument produces a pair of mirror twin beams which are recombined as substantially identical beams for maximum interference effect. When one of the recombining beams is shifted laterally with respect to the other the amount of reinforcement and cancellation is diminished and indeed the relative beam motion generates fluctuations in the intensity observed by a photocell just as do the fringes to be counted. Since the beams impinging on the retroflectors of the Peck goniometer are mirror identical beams a lateral shift of the gonior by an amount $S/2$ shifts each of the recombining beams by an amount $S$ in opposite *directions*. Thus there is a four-fold multiplication of the misregister resulting from lateral motion from the gonior in a device as disclosed by Peck. In contrast, in the above embodiment wherein substantially *identical beams* impinge upon the retroflectors they are shifted in the same direction and the recombination of twin rays in the isophase beams which is the strength of the Michelson instrument is preserved. In other embodiments of the present invention recombination of twin rays (whether the beams incident on the gonior be identical or mirror identical) is preserved by double encounters with each of the retroreflectors by which feature the change in measured path length is doubled. Thus, it is seen that to gain the benefits of a Michelson type interferometer (where a pair of beams are generated at a beam splitter) in a sine law goniometer wherein the two biphase beams are directed to a pair of retroflectors on a gonior, there must be compensation for beam displacements that are introduced by translation of the gonior in the plane perpendicular to the axis of rotation. If the number of reflections imposed upon each biphase beam is such that the beams incident upon the retroflectors are symmetrical with respect to the axis of rotation (ideally either identical or mirror identical about an axis perpendicular to the axis of rotation), or if the paths of the biphase beams to be compared each include an even number of reflections of each beam against its corresponding retroflector, the lateral shift in the reflected beam is made equal in each of the beams returning to the recombination beam splitter or is eliminated from each beam before its arrival at the beam splitter.

Such freedom from error results from the use of an even number of reflections (in the plane of FIG. 1S) in both of the light beams. Thus the beam including rays 44, 46 and 48, by way of example, is doublly reflected while traversing the return optical path from the gonior 42 to recombination within the stator, and the beam including rays 34, 36 and 38 is doubly reflected while traversing the path from the light source within the path from prism 68 on the gonior. It will be seen that the path from the light source 16 out to prism 42 of the gonior requires no reflections, and that the return path from prism 68 to recombination within the stator apparatus 12 requires no reflections. Thus, the beams of both legs of the interferometer are reflected an even number of times (zero being considered to be an even number). Conversely, the apparatus of the reference patent applies an even number of reflections to a first beam and an odd number of reflections to a second beam, with the result that the two beams are optically unsymmetrical although mirror identical with respect to the axis of rotation of the gonior, thereby introducing error in the event of inadvertent linear translations of its rotatable member. The only reflections considered in establishing the even numbers are those which redirect a beam in a plane normal to the axis of the gonior, i.e., those parallel to the plane of the paper in FIG. 1A. For example, a dihedral mirror having its roof edge in a plane normal to the axis of the gonior counts, in this analysis, as a single reflection, but with its roof edge parallel to the gonior axis counts for two reflections as does a cube corner reflector.

In the embodiment of FIG. 1, it is immediately obvious that the mechanical alignment problem between the optical elements of the stator and gonior of the prior device has been markedly reduced, since only the retroflecting devices (42, 68) are attached to the rotatable platform 14, and, further, rotatable platform 14 itself is positioned wholly external to the stator portion 12 of the apparatus. However, it also may be noted that in this particular embodiment the maximum angular rotation is still limited by the inherent design of the optical system, which reduces the system sensitivity as the angle through which the gonior rotates increases. For angular displacements other than zero, the parallel light beams incident on the gonior are displaced from the optical axis of the retroreflecting devices, and therefore the amount of lateral displacement of the light beams reflected by the retoreflecting devices is a function of the degree of angular rotation. Thus, the reflected rays returned to mirror 50 and recombining beam splitter 52 are offset and do not recombine exactly at points 76, 78 and 80, and therefore, only a portion of the total light energy of both beams recombines, the amount decreasing as the relative angular displacement of the gonior increases. This situation per se does not adversely affect the state of interference in the center of apertures 102 and 104, but it does limit the range of angle measurement by affecting the uniformity of the state of interference over the small areas of apertures 102 and 104.

Figure 2:
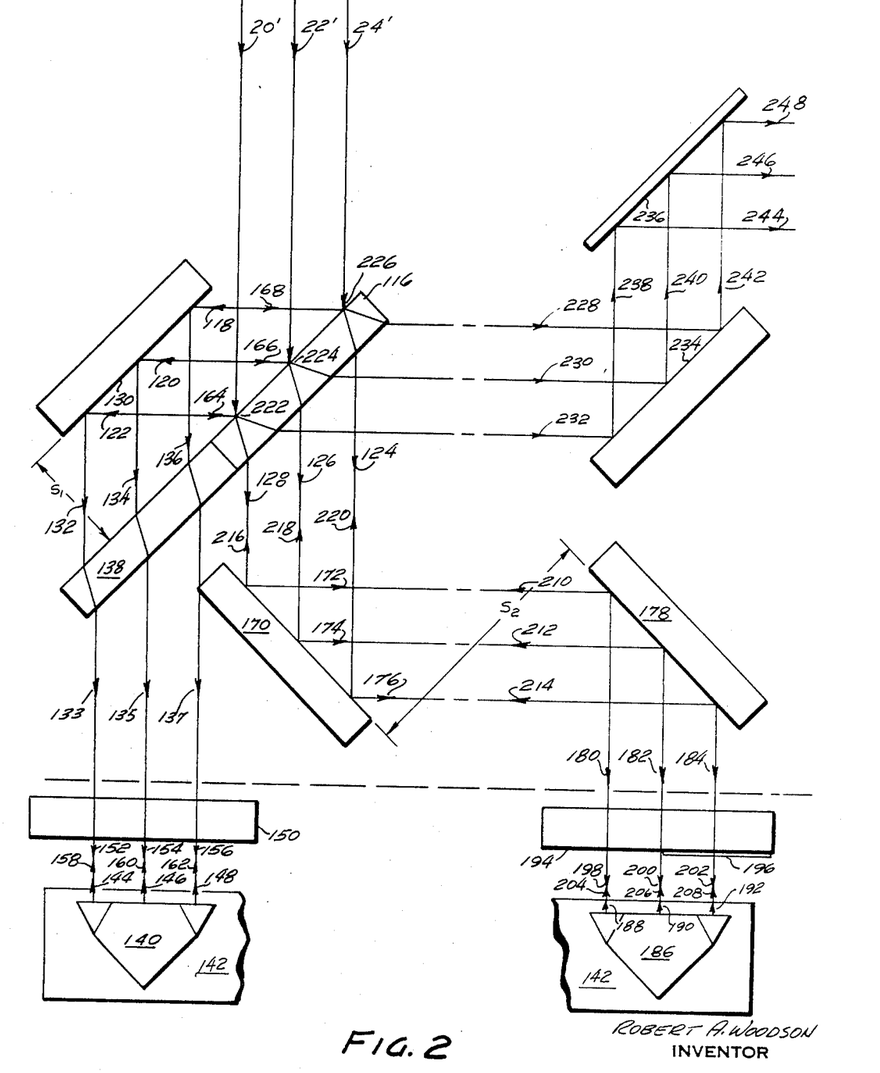
FIG. 2 illustrates a modification of the embodiment of FIG. 1A.

Referring now to FIG. 2, there is shown a modification of the apparatus of FIG. 1A wherein the amount of light recombined is substantially independent of the angular rotation of the gonior within wide limits. As there shown, a parallel light beam, generated by means similar to that shown in FIG. 1A and including rays 20', 22' and 24', is incident on a beam-splitter 116. The latter is effective to produce a pair of approximately equal intensity light beams, the first, or reflected beam, including rays 118, 120 and 122, and the second, or transmitted beam, including rays 124, 126 and 128. The reflected beam is directed toward a full mirror 130 which provides a downwardly reflected beam, including rays 132, 134 and 136, which first is transmitted through a compensating plate 138, emerging as a displaced, but not deviated, beam, including rays 133, 135 and 137 and is thereafter incident upon a cube corner prism 140 mounted on gonior 142. Plate 138 being an extension of the same piece of glass exhibits similar optical properties as beam splitter 116, that is, it provides the same optical path length for the transmitted beam, without, however, exhibiting strong reflection properties. Thus, it acts with the same manner as a compensating plate employed, in a conventional Michelson interferometer and provides that each of the separated parallel beams directed to and from the gonior traverse this piece of glass either beam-splitter end 116 or compensating plate 138 an equal number of times. Continuing, the beam directed to retroreflecting prims 140 is multiply reflected thereby as hereinbefore described and emerges reversed left to right and laterally displaced, in a direction normal to the plane of FIG. 2, as an upwardly directed beam including rays 144, 146 and 148 corresponding to incident rays 156, 154, and 152 respectively. This beam is not directly directed toward recombining with the other of the parallel beams incident upon the gonior at this time, but rather is intercepted by a full mirror 150 fixed to the stator perpendicular to the incident beam 133, 135, 137, and reflected downward again toward prism 140 as another beam (rays 152, 154 and 156). This beam also is multiply reflected by prism 140 and is laterally shifted in a sense opposite to the shift suffered by the original beam (rays 133, 135 and 137) incident upon prism 140. Rays 152, 154 and 156 emerge from prism 140 as an upwardly directed beam (rays 158, 160, and 162). This beam and every ray in it now back tracks its original path and is transmitted through compensator 138 to mirror 130 and is reflected thereby to form a new beam (rays 164, 166 and 168) which thereafter impinges upon the half-reflecting surface of beam splitter 116.

Returning now to the beam transmitted by beam splitter 116, the other parallel path should be obvious. This beam (rays 124, 126 and 128) is first directed to a mirror 170 and reflected thereby as another beam (rays 172, 174 and 176) towards mirror 178 and then downwardly reflected by mirror 178 as shown by rays 180, 182 and 184, which enter half the aperture of cube corner prism 186 mounted on gonior 142, wherein they are multiply reflected and laterally displaced and directed upwards as indicated by rays 188, 190 and 192. As in the other path, the rays emergent from prism 186 are reflected by mirror 194 fixed to the stator and perpendicular to the incident rays. In order to obtain reversible counting, phase retarder 196 is effective to cover one-half the aperture of mirror 194. In this embodiment, however, since the light beam passes twice through phase retarder 196, the retarder need be only one-eighth wave length in thickness to provide the required 90° phase shift. The phase shift may be provided by use of a dielectric coating at 196 (as at 40 in FIG. 1A) taking account of the normal incidence of light thereon, or alternatively by use of a front surface mirror coating that forms a one-eighth wave step in mirror 194 along one edge of coating 196. The reflected beam from mirror 194 indicated by rays 198, 200 and 202 again is multiply reflected and laterally displaced by prism 186 and returns to the half-reflecting surface of beam splitter 116 over the original path (note rays 204, 206 and 208 corresponding respectively to original rays 198, 200, and 202) which includes mirror 178 (note rays 210, 212 and 214) and mirror 170 (note rays 216, 218 and 220).

Next, the pair of parallel light beams returned from the gonior are recombined at the half-reflecting surface of beam-splitter 116 at points 222, 224 and 226, for example, each isogenous ray pair returning to their point of origin on the splitter surface, and a portion of the recombined beam is transmitted through beam splitter 116. This beam (note rays 228, 230, 232) is thereafter deflected to the detection and counter section of the apparatus by a further pair of full mirrors 234 and 236. Rays 244, 246 and 248 correspond to rays 90, 92, and 94 of FIG. 1A, and are thereafter handled similarly.

An important feature of this embodiment is the addition of mirrors 150 and 194 to provide for full recombination of the parallel light beams independent of the relative angle between the optical elements mounted on the stator and gonior. The angular interferometer of FIG. 2 is also insensitive to linear translation of the gonior. This insensitivity results because the lateral shift of the beam reflected by each prism as it rotates is cancelled out by a corresponding reverse shift when the reflected beam is again directed through the prism, in this manner no resultant shift in either of the beams to be recombined.

The distance $S_1$ between beam-splitter 116 and mirror 130 is preferably made substantially equal to distance $S_2$ between mirrors 170 and 178 for purposes of symmetry. An alternative embodiment of his invention omits mirrors 170 and 178, placing prism 186 to receive the beam including rays 124, 126 and 128, and placing the full mirror 194 parallel to mirror 150 and at such a position as to intercept the beam reflected upward by prism 186 with substantially zero path difference when the gonior 142 is set at the zero angle.

Figure 3:
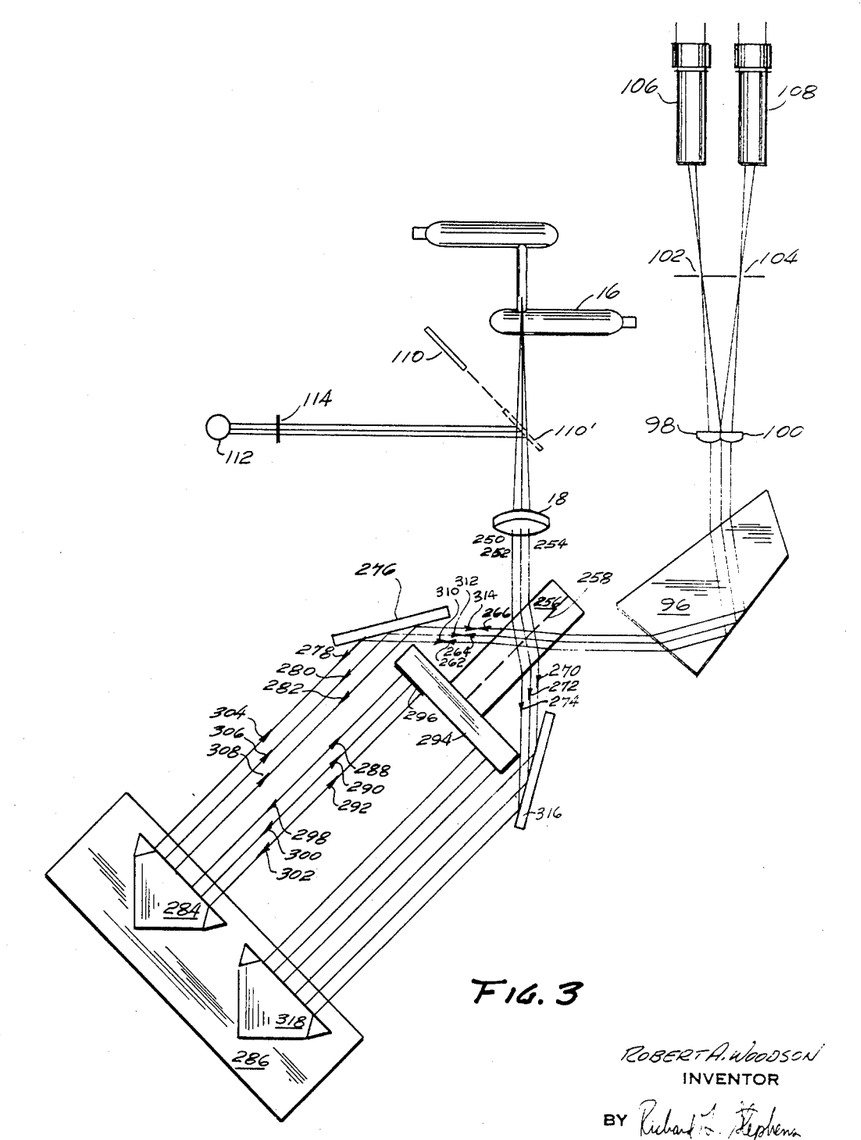
FIG. 3 is an optical schematic of another embodiment of the interferometric apparatus of the invention.

Referring now to FIG. 3, there is illustrated yet another embodiment of the invention which incorporates an improved optical system as well as the double prism reflection described above. In FIG. 3 the source of collimated light and the detection and counting circuits, may be identical to those of FIG. 1A, and thus are given the same reference numerals. The collimated light beam (rays 250, 252 and 254) is refracted by an optical device 256 fabricated of optically flat glass or fused silica. Positioned at the center of device 256 is a beam splitter 258 of the interfacial or sandwich type (which could alternatively be of the pellicle or thin membrane variety). A portion of the light incident upon beam-splitter 258 is reflected thereby as rays 262, 264 and 266, and the remainder (rays 270, 272 and 274) is transmitted therethrough. The reflected beam is further reflected by a mirror 276 as rays 278, 280 and 282 toward a cube corner prism 284 forming a part of gonior 286. Prism 284 triply reflects and laterally displaces the incident beam as shown, and the re-emergent beam (rays 288, 290 and 292) are intercepted by a full mirror 294, half of which is coated with a one-eighth wave length phase retarded coating 296. The beam reflected by mirror 294 as rays 298, 300 and 302 is again triply reflected and laterally displaced by prism 284 and then directed towards mirror 276 as rays 304, 306, and 308 and eventually returned to beam-splitter 258 as shown by rays 310, 312 and 314. The other parallel optical in this embodiment is similar to the path just described, with the exception that it contains no phase retarder, and includes mirror 316, cube corner prism 318, and a further portion of mirror 294. It may be seen that this embodiment also povides an angle interferometer wherein the gonior is located externally of the optical elements secured to the stationary portion of the interferometric apparatus, or the stator, and the angle to be measured may be greater than that measurable using the devices of the prior art.

In all of the embodiments hereinabove described, it is apparent that the maximum angle which each can measure, although greater than those attainable in the system of the prior art, is necessarily limited by the stationary optical elements which direct the light beams towards the rotatable gonior. The following embodiments, however, employing the principles of the invention, extend the range of measurable angular displacements, in one embodiment to approximately 45° and in the other to as much as 360°.

Extremely wide angle interferometers require some significant departures in optical techniques from the previously described embodiments in order to maintain accuracy over the entire range of measurement by eliminating all sources of second order error. Firstly, the corner cube prisms employed in the gonior in the previous embodiments are replaced by front-surface dihedral mirrors. Because the prisms of the limited range systems are used either on-axis, or only slightly off-axis, the virtual vertex of each corner cube prism remains, for all practical purposes, in a fixed location with respect to the remainder of the optical system. When a pair of corner cube prisms are used together, their virtual vertices may differ somewhat with respect to the locating face of the prims, but usually such a difference leads to a constant offset which is undetectable and does not constitute a system error.

However, the employment of such prisms through an off-axis range of ±22.5°, by way of example, results in more severe requirements. If the prisms are not exactly identical in length, homogeneity, local power, etc., which is usual, their virtual vertices will not track each other during rotation of the gonior, causing an unpredictable error in the number of fringes. Moreover, even assuming optically perfect prisms, fully identical to each other, a change in orientation of the prisms up to 22.5° from the on-axis position introduces an additional term to the sine function which the gonior generates. This term can, of course, be compensated for, but only at the expense of a considerable increase in system complexity. The substitution of front surface dihedral mirrors in the extended range angular interferometers to be described eliminates variation in the optical path angle through glass elements across the measurement range, and thereby removes all terms from the output except the basic sine function.

Generally, it is desirable in automatic interferometers to employ as large a reflector, and therefore as large an aperture, as possible since high speed electronic counting requires an adequate level of light. In the hereinafter described embodiment, however, it is preferred to reduce the aperture in order to provide 360° measurement capabilities without encountering any mechanical clearance problems. This reduction in aperture area reduces the system light level and hence reduces the maximum counting rate because noise contributed by the light source and the photomultipliers becomes more significant. However, the maximum counting rate may still be of the order of several kilocycles per second, which is usually more than adequate. Because compactness is a significant virtue, the optical path is folded by the inclusion of an auxiliary reflecting plate, as will be described. Any measurement error contributed by misalignment of the auxiliary plate, or by any other of the fixed optical elements, may be corrected, if necessary, by the insertion of wedges into the optical path.

Angular wobble originating in the shaft whose rotation is to be measured may cause a measurement error. This error, being a function of shaft position, cannot be corrected by a fixed wedge or other means. However, it is impractical to impose a shaft tolerance which would have a negligible effect on the accuracy of the measuring system. Should a small but undeterminable misalignment exist in the rotor axis direction, the end reflector mirror surfaces are preferably replaced by a pair of 90° dihedral mirrors attached to a reference plate with their roof edges located in a plane parallel to the reference plate. By this means, even through rotor wobble may deviate the entering light beams from their intended perpendicular path with respect to the reference plate, after reflection from the gonior, the 90° dihedrals at the stator will return them parallel to themselves, and the exit point will not be shifted.

The light source must provide an intense spectral line of sufficient purity (narrowness) that overlap of the $n$th and $(n+1)$th fringes is not sufficiently great to excessively degrade the contrast between the bright and dark fringes at the limits of measurement. The need for a very narrow spectral line tends to conflict with the requirement that the light be sufficiently bright to produce an adequate flux input to the photomultipliers to allow the desired counting rate. The Krypton discharge lamp employed in the previously described embodiments of the invention provides adequate illumination and spectral purity for the relatively low maximum order of interference encountered by these systems, but the useful spectral line of this lamp is neither narrow enough nor bright enough to permit its use in the extended range interferometers. For this reason, an improved microwave-excited mercury 198 lamp is provided. Pure isotopic mercury produces a very narrow spectral line of high brillance, but the brilliance of the lamp is sharply temperature dependent so that a thermostatically controlled liquid cooling system is required. A typical light source may comprise a small closed glass tube containing approximately one milligram of mercury 198 and argon at a pressure of about three torr. The lamp may be mounted within a larger glass tube which forms the cooling jacket and which is secured in a microwave resonant cavity. Upon subjecting such a lamp to about 30 watts of 2450 Mc./sec. RF power, the spectral width and brilliance of the green (5462.27046A) line generated thereby is sufficient to provide a suitable monochromatic light source for the extended range angular interferometers. Alternate light sources which also may be employed include lasers, ultraviolet mercury lamps using selective absorption (Zeeman effect), or a more conventional mercury lamp equipped with a Fabry-Perot super monochromator.

Figure 4B:
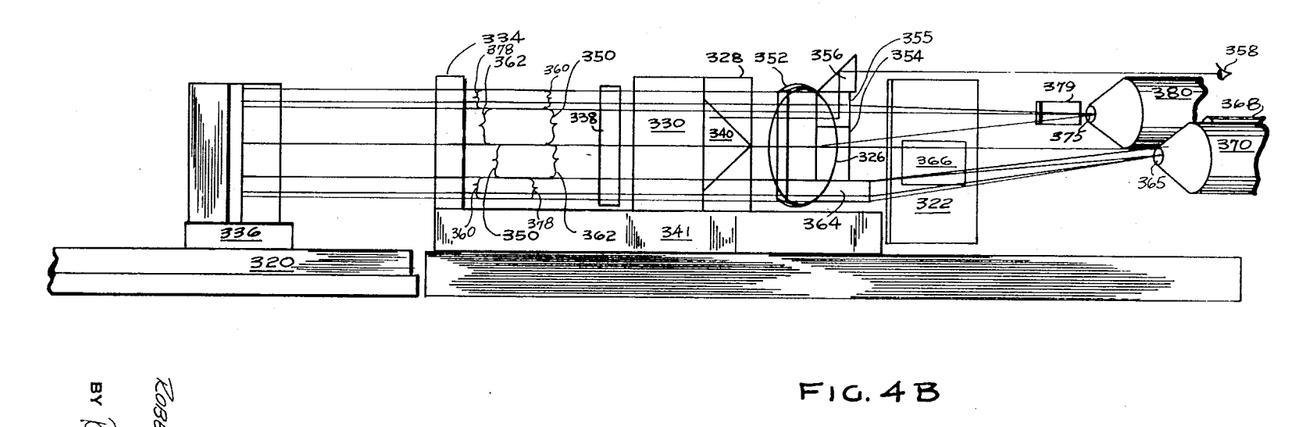
FIG. 4B is a side view of the optical schematic of FIG. 4A.

FIGS. 4A and 4B show an optical schematic of a first extended range angular interferometer which employs the principles of the invention. In view of the detailed description of the optical paths of the various embodiments previously described it is deemed sufficient now to merely point out the beam at various locations throughout the optical paths, in order to afford a complete understanding of the invention.

In the embodiments of FIGS. 4A and 4B, a gonior 320 comprises the only rotatable portion of the system. The light source, photomultipliers, and optical elements for beam division, recombination, spectral line separation, and phase retardation, comprise the optical portion of the stationary stator. Monochromatic light from a mercury 198 source 322 passes through a slit 324 and is collimated by a lens 326 to a parallel beam. The aperture of this beam is rigidly controlled as hereinafter discussed. The collimated light passes through a reference plate 328 and enters a beam-splitting prism 330. Prism 330 is a cemented double prism with a semi-reflecting interface and provides two functions. Its first function is to divide the incident beam into two portions of equal intensity and to recombine them on their return back from the gonior. Its second function is to act as a monochromator prism and thereby cause physical separation of the metering line from its spectral satellites.

The portion of the collimated beam transmitted by the beam-splitting prism 330, which portion is indicated at 332 in FIG. 4A, is directed to and reflected from an auxiliary reflecting plate 334 and toward the surface of reference plate 328. This surface of reference plate 328 is, except for the region occupied by prism 330, coated with a front surface mirror which reflects beam 332 onto dihedral mirror 336 of gonior 320. The angle between the two dihedral mirrors is 85°, resulting in beam 332 being reflected at an angle of 10° with respect to the incident beam. This angle is preferred so that the direction of the reflected beam is perpendicular to the plane of plate 328. The beam next passes through a phase retarder 338, one-half of the surface area thereof being covered with a one-eighth wavelength coating, and reaches a fixed roof mirror 340. Dihedral mirror 340 has a 90° roof and is mounted on the stator base plate 341 (FIG. 4B) and aligned with reference plate 328 so that the roof edge is parallel to base plate 341 and reference plate 328 and at right angles to the roof edges of the dihedral mirrors (336, 344) on gonior 320. This type of retroreflector, in place of a plane mirror surface, is provided so that reasonable tolerances can be assigned to vertical parallelism of all reflecting surfaces, so that some rotor wobble can be tolerated, as briefly discussed above.

The portion of the original collimated beam reflected by beam-splitting prism 330 is shown at 324. It is reflected from plate 320 to a second dihedral reflector 344 on gonior 320 and thence reflected through compensating plate 346 having optical properties the same as those of the uncoated portion of phase retarder 338. The beam reaches a second roof mirror end reflector 348 and then retraces its path back to the beam splitting interface of prism 330 which recombination of the two beams occurs. The reflected portion of the originally transmitted light and the transmitted portion of the originally reflected light are two coherent bundles of light with a phase relationship determined by the angular position of the gonior, and recombine to provide interference fringes of equal inclination. It may be noted that during the return transmission of the beam through prism 330 further separation of spectral lines is achieved, so that the dispersion provided by monochromator prism 330 is doubled.

The interfering light leaving reference plate 328 is split along its rectangular aperture into four parts, three of which are monochromatic light and the fourth of which is polychromatic light. One part, indicated as 360 (FIG. 4B) is used for visual observation. A stigmator lens 352 stigmates this beam, and a set of prisms 354, 355 and 356 (FIG. 4A) select and direct this portion of the interfering light in the direction indicated in FIG. 4A, and interference fringes may be observed from location 358. Light from the lowermost part of the exit aperture, or uppermost part of the entrance aperture, indicated as 378 in FIG. 4B, enters (via stigmator lens 352) prism 354 and further prism 364, from where it is directed through slit aperture 365 and diverging lens 369 to photomultiplier 370. Prism 354 reflects portion 360 of the exit light beam toward a mirror 379 which further reflects the light through slit aperture 375 and diverging lens 377 onto a photomultiplier 380. Portion 362 of the exit light beam is reflected by prism 354 toward a mirror 366, through slit 363 and lens 367 onto the photomultiplier 368.

Rather than energizing a white light source during the zeroing operation only, the light source is continuously energized in the device of FIGS. 4A and 4B. White light from tungsten lamp 372 is transmitted by slit 373, imaged by axially movable lens 374 and directed by mirror 376 and collimating lens 326 into a path parallel to and contiguous with the monochromatic collimated beam. Lens 374 is made movable in order to provide a coarse-fine zero adjustment, since when lens 374 is in position 374, shown in FIG. 4A, the resultant fringe pattern is detectable over a wider angular range, than when lens 374 is shifted to a position such as indicated as 374', as will be understood by those skilled in the art. Referring specifically now to FIG. 4B, it can be seen that the entrance light aperture includes monochromatic portions 350, 360 and 362 and polychromatic portion 378. By way of example, a typical combined aperture may measure 0.25 inch in a direction parallel to base plate 341 and 1.25 inches perpendicular to the base plate, wherein the latter dimension includes 1.0 inch of monochromatic light and 0.25 inch of polychromatic light. The white light enters reference plate 328, and, after passing through the optical elements of the interferometer in paths identical to the paths of the monochromatic light described above, is reflected by prism 364 into a photomultiplier 370. Since interference of white light can only occur when the difference between the lengths of the paths of the two divided beams is very nearly zero, the output of photomultiplier 370 can be used for zero adjustment.

For optimum measuring accuracy, it is essential that the phase difference between the divided paths be exactly 90°. This can be precisely adjusted by tilting phase retarder 338. Upon tilting the retarder, the optimum path through the retardation coating, and thus the amount of phase shift, increases. By applying a coating of a little less than one-eighth wave length for perpendicular incidence a very fine adjustment is provided. The compensating plate 346 in front of roof mirror 348 is also adjustable and provides the necessary optical compensation in the other path of the interferometer. Alternatively, a single plate (not shown) having the retardation coating over a portion of its area may be located between prism pair 330 and mirror 334 to replace plates 338 and 346.

Figure 5:
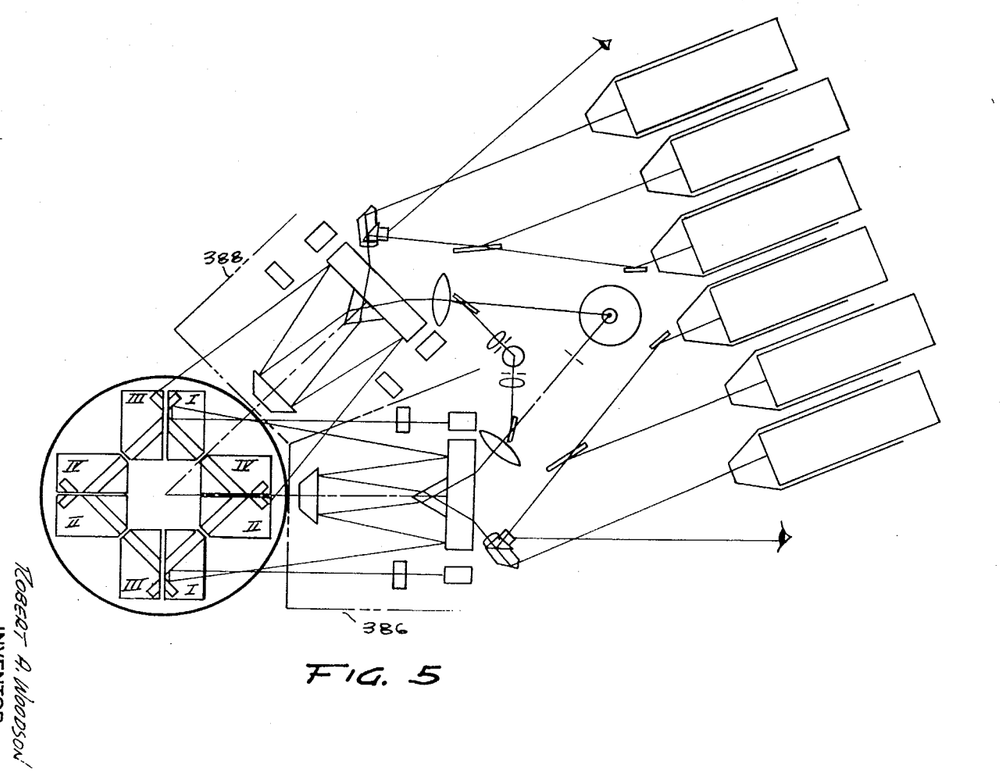
FIG. 5 is an optical schematic of a further embodiment of the interferometric apparatus of the invention.

By employing an additional set of stationary optical elements mounted on another stator and additional pairs of dihedral reflectors mounted on the gonior, the embodiment of FIG. 4A can be extended to provide an angular interferometer for measuring angles up to and including 360° or more as diagramatically illustrated in FIG. 5. As there shown, a pair of stators 386 and 388 and four pairs of dihedral mirrors I—I, II—II, III—III, and IV—IV are provided, with the axis of stator 388 rotated 45° relative to that of stator 386 so that one light source feeds both interferometers.

Before considering the operation of this embodiment in measuring angles as great as 360°, the operation of the system to measure an angle of 90° is first described, the extension to 360° then becoming obvious. To measure up to 90°, it is necessary to employ dihedral mirrors I and I only. These two mirrors, together with stator 386, are effective to measure angle displacements from −22.5° to +22.5° in the manner hereinbefore described with respect to FIG. 4A. However, the angle +22.5° exactly corresponds to the angle −22.5° with respect to stator 388. Thus, stator 388 together with the pair of dihedral mirrors I—I are then effective to measure a further adjacent angular displacement of 45°.

With a single pair of dihedral mirrors employed, the scale factor for both interferometers is identical. Accuracy over the total 90° range will depend on alignment of the two stators exactly 45° apart, and accurate alignment may be achieved by the following procedure. The gonior is rotated to the exact +22.5° position of stator 386, starting from the zero path position and during such rotation, a certain number of fringes will be counted. The counter is then connected to stator 388 and the gonior is then further rotated until the total count has doubled. The gonior should then be at the zero path position of stator 388, which can be checked by attempting to view white light fringes. If an error is found, the angle between the two two stators must be corrected. This procedure may be repeated until the required accuracy is achieved.

The extension of the 90° interferometer to measure angular displacements up to and including 360° should now be readily understood from reference to FIG. 5 and the following table which lists the gonior-stator combinations which are functional over the individual angular sections:

| Angular Range | Dihedrals | Stator |
|---|---|---|
| 0–45° | I | 386 |
| 45°–90° | I | 388 |
| 90°–135° | II | 386 |
| 135°–180° | II | 388 |
| 180°–225° | III | 386 |
| 225°–270° | III | 388 |
| 270°–315° | IV | 386 |
| 315°–360° | IV | 388 |

Although the embodiment of FIG. 5 may appear to be only a simple extension of the embodiment of FIG. 4A, several unobvious alignment problems should be noted. In addition to the the problems of stator alignment and synchronization of the photomultiplier signals at the crossover point, it may be difficult to arrange successive dihedral mirror pairs exactly at 90°, and may be difficult to establish the chord length (or distance between) the two mirrors of each pair. Because it is difficult to adjust the chord of all pairs of that their scale factors are identical, it is preferred to calibrate the instrument separately for the different pairs and to introduce the appropriate scale factors into the final angular measurement determination.

Although the above-described embodiments have been described as used in angular measurements, it will be apparent that by several minor modifications, the apparatus of the invention is also adaptable to measure linear displacements. Such measurements may be accomplished by first performing a zero positioning operation and the rigidly securing the gonior, by means of the securing means shown symbolically at 321 in FIG. 4B, for example, and then translating one of the pair of gonior reflecting devices through the linear displacement to be measured, by the translating means shown symbolically at 323 in FIG. 4B, for example, thereby altering one of the optical paths with respect to the other and providing a number of interference fringes determined by the component of the distance travelled parallel to a reference direction. The fringes are countable in the conventional manner.

What has been described is an improved family of angular interferometers each of which has its relatively rotatable portions located wholly externally from its stationary portions, and each of which is capable of measuring angles greater than those attainable with devices of the prior art, and in each of which looseness or play in the rotor bearing does not adversely affect accuracy of angular measurement. Although the invention has been shown and described merely as an angular interferometer, it should be understood that the principles of the invention are readily adaptable in devices for measuring the rate of change of an angle.

While the invention has been shown and described with respect to several embodiments, it will be understood that various changes and modifications may be made therein without departing from the spirit of the invention.

What is claimed is:

1. An interferometric apparatus for accurately determining angular displacements comprising,
   (a) a beam splitting mirror for producing a diverging biphase pair of beams;
   (b) first retroreflecting means for intercepting one of said beams and providing a first reflected beam in a predetermined direction at a predetermined angle with respect to said one beam;
   (c) second retroreflecting means for intercepting the other of said beams providing a second reflected beam in said predetermined direction and at said predetermined angle with respect to said other beam;
   (d) said first and second retroreflecting means being rotatable about a common axis;
   (e) mirror means for redirecting said first and second reflected beams back into said first and second retroreflecting means, said beams upon further reflection from said retroreflecting means forming a converging pair of biphase beams; and
   (f) means including a beam splitting mirror for recombining said converging beams to form interference fringes and reversible counter means for indicating angular displacement of said first and second retroreflecting means with respect to predetermined direction.

2. An interferometric apparatus for accurately determining angular displacements comprising,
   (a) a gonior;
   (b) a plurality of stationary optical elements;
   (c) said gonior including at least one pair of spaced apart retroreflecting devices each effective to provide a reflected radiation beam at a predetermined angle with respect to an incident beam;
   (d) said plurality of stationary optical elements including a source of monochromatic radiation, means for collimating said radiation into a substantially parallel beam, first beam-splitting means for dividing said beam into a biphase pair, means for directing each of said biphase pair onto one of said gonior retroreflecting devices, means for directing further beams reflected from said gonior onto a second beam-splitting means, said second beam-splitting means effective to recombine said further beams into a single interfering beam, and each of said directing means including an even number of reflecting means including said first and second beam-splitting means;
   (e) said gonior being rotatable through an angle to be measured; and
   (f) means for determining angular displacement in terms of the relative changes in the optical path traversed by each of said further beams as said gonior rotates.

3. An interferometric apparatus for accurately determining angular displacements comprising,
   (a) a plurality of stationary optical elements;
   (b) at least one source of radiation;
   (c) a gonior whose angular displacement with respect to said stationary optical elements is to be determined;
   (d) said gonior including at least one pair of spaced apart retroreflecting devices each effective to provide a reflected beam of radiation that makes a substantially constant angle with a fixed incident beam of radiation;
   (e) said stationary optical elements including means for collimating said radiation, means for dividing said radiation into a biphase pair of beams, means for redirecting said radiation towards said gonior as parallel and symmetrical relative to the vector of said displacement, means for recombining said beams reflected from said gonior to provide interfering fringes; and
   (f) means for determining angular displacement from said fringes in terms of the relative changes in the optical path traversed by each of said radiation beams as said gonior rotates.

4. The appartus of claim 3 wherein said collimating means includes a single lens optically positioned before said dividing means.

5. The apparatus of claim 4 wherein said means for determining angular displacement includes a pair of lenses optically positioned after said dividing means.

6. An interferometric apparatus for accurately determining angular displacements comprising,
   (a) a gonior;
   (b) a plurality of stationary optical elements;
   (c) said gonior including a pair of spaced apart retroreflecting devices each effective to provide a reflected radiation beam parallel to but laterally displaced from an incident light beam, said gonior being rotatable through an angle to be measured;
   (d) said plurality of stationary optical elements including means for providing a collimated beam of radiation, beam-splitting means for dividing said beam into a first reflected beam and a second transmitted beam and thereafter recombining reflected portions of said first and second beams into a further interference beam, single reflection means one for each of said first and second beams effective to direct said beams to one of said gonior retroreflecting devices and, further reflecting means for redirecting beams reflected by said gonior again towards said retroreflecting devices of said gonior; and (e) means for determining the order of interference fringes of said further beam as said gonior rotates, said order of interference being a measurement of the angular displacement of said spaced apart retroreflecting devices with respect to said directed first and second beams.

7. The appartus of claim 6 wherein the optical paths traversed by each of said first and second beams is equal when said gonior is at a predetermined angle with respect to said plurality of stationary optical elements.

8. The apparatus of claim 7 wherein the optical path traversed by one of said beams includes a phase shifter to provide a predetermined phase shift of one portion of one of said beams with respect to the other of said beams.

9. The apparatus of claim 6 wherein said plurality of stationary optical elements further includes a source of polychromatic light selectively operable to provide interference fringes of maximum contrast only when said gonior is positioned in said predetermined angular relationship with respect to said plurality of stationary optical elements.

10. An interferometric apparatus for accurately determining angular displacements comprising,
(a) a gonior;
(b) a pair of a first and a second plurality of stationary optical elements;
(c) said gonior including at least one pair of spaced apart retroreflecting devices each effective to provide a reflected radiation beam at a predetermined angle with respect to an incident light beam;
(d) each of said pair of a first and a second plurality of stationary optical elements including means for generating a pair of coherent radiation beams each directed towards one of said gonior retroreflecting devices and reflecting means for redirecting said gonior reflected beams again towards said at least one pair of gonior retroflecting means;
(e) said gonior being rotatable through an angle to be measured; and
(f) means for determining the angular displacement in terms of the relative changes in the optical path traversed by each of said parallel light beams as said gonior rotates.

11. The appartus of claim 10 wherein the major axes of said pair of a first and a second plurality of stationary optical elements intercept at an angle of 45°.

12. The apparatus of claim 10 wherein said first and second plurality of stationary optical elements is evenly spaced from a single source of monochromatic radiation, and wherein said beam generation means both collect said radiation.

13. The apparatus of claim 10 wherein said first and second plurality of stationary optical elements are aligned with a single source of polychromatic light.

14. The apparatus of claim 10 including four pairs of spaced apart retroreflecting devices.

15. The apparatus of claim 10 wherein said at least one pair of spaced apart retroreflecting devices each consists of first surface dihedral mirrors.

16. An interferometric apparatus for accurately determining angular displacements comprising,
(a) means for producing a pair of coherent monochromatic beams of radiation;
(b) means for producing a polychromatic beam of radiation;
(c) first optical means for parallely and contiguously combining said last named beam with each of said pair of first named beams;
(d) first and second retroreflecting means each for intercepting one of said combined beams;
(e) said first and second retroreflecting means being rotatable about a common axis;
(f) means recombining reflected beams from said first and second retroreflecting means to provide interference fringes;
(g) second optical means for separating said monochromatic radiation beam from said polychromatic radiation beam; and
(h) reversible electronic means for indicating the angular displacement of said first and second retroreflecting means about said common axis from a reference position in accordance with the variations in intensity of said interference fringes.

17. The apparatus of claim 16 wherein said second optical means is further effective to divide said recombined monochromatic radiation beam into a plurality of divergent beams.

18. The apparatus of claim 17 wherein at least one of said plurality of divergent beams differs in phase a predetermined amount from the phase of another of said plurality of divergent beams.

19. An interferometric apparatus for accurately determining angular displacements comprising,
(a) a gonior;
(b) a plurality of stationary optical elements;
(c) said gonior including a pair of spaced apart retroreflecting devices each of which provides a reflected radiation beam antiparallel to a fixed incident beam;
(d) said plurality of stationary optical elements including beam-splitting means for dividing a collimated radiation beam into a pair of further beams, a first of which is reflected by, and a second of which is transmitted through, said beam-splitting means, single reflection means for directing said first beam towards one of said gonior retroreflecting devices, double reflection means for directing said second beam toward the other of said gonior retroreflecting devices, and reflecting means to redirect said gonior reflected beams again towards said pair of spaced apart retroreflecting devices of said gonior;
(e) said reflection means being positioned to render said further beams identical rather than mirror identical for incidence upon said retroreflector devices;
(f) said gonior being rotatable through an angle to be measured; and
(g) means for determining the angular displacement through which said gonior rotates including said beam-splitting means which is further effective to recombine said first and second light beams into a single interfering light beam.

20. The apparatus of claim 19 wherein said plurality of stationary optical elements further includes a compensating plate in the path of said beam whose optical characteristics are identical to the non-reflecting optical characteristics of said beam-splitting means.

21. Interferometer means for measuring angular movement of a rotatable member comprising:
a pair of retroreflector prism members mounted on said rotatable member on opposite sides of the center of rotation of said rotatable member, a fixed light source, fixed means to split the beam from said light source into first and second beams, fixed means to transmit said first beam to one of said retroreflector members, fixed means to transmit said second beam to the other of said retroreflector members, fixed mirror means positioned to receive said first beam from one of said prism members and transmit said first beam back to said one prism member, second mirror means positioned to receive said second beam from the other of said prism members and adapted to transmit said second beam back to said other prism member, the path lengths of transmission of said first and second beams being calibrated, means to then receive said beam reflections from said first and second retroreflector prism members, and means to combine said reflections to provide an interference fringe pattern movement proportional to the difference in length between said paths resulting from rotation of said rotatable member.

References Cited
UNITED STATES PATENTS

| | | | |
|---|---|---|---|
| 2,571,937 | 10/1951 | Peck | 88—14 |
| 2,583,596 | 1/1952 | Root | 88—14 |
| 3,011,346 | 12/1961 | Garvin. | |

JOHN K. CORBIN, Primary Examiner

U.S. Cl. X.R.

350—173, 286